United States Patent

[11] 3,549,894

[72] Inventor Christian Ortmann
Marbach, Germany
[21] Appl. No. 773,567
[22] Filed Nov. 5, 1968
[45] Patented Dec. 22, 1970
[73] Assignee International Standard Electric Corporation
New York, N.Y.
a corporation of Delaware
[32] Priority Dec. 14, 1967
[33] Germany
[31] No. 1,549,905

[54] ARRANGEMENT FOR OPTICALLY SCANNING A RECORDING MEDIUM USING FIXED LAMPS FOR ILLUMINATION
3 Claims, 4 Drawing Figs.
[52] U.S. Cl. ................................................... 250/219,
178/7.6; 250/224

[51] Int. Cl. ........................................................G06m 7/00,
H01j 39/12; H04n 3/00
[50] Field of Search............................................ 250/219I,
219ICR, 219IA, 219ID, 219Web, 224; 178/7.6

[56] References Cited
UNITED STATES PATENTS
2,532,799  12/1950  Young.......................... 250/219X Primary Examiner—Archie R. Borchelt
Assistant Examiner—T. N. Grigsby
Attorneys—C. Cornell Remsen, Jr., Walter J. Baum, Percy P. Lantzy, Philip M. Bolton, Isidore Togut and Charles L. Johnson, Jr.

ABSTRACT: An improved arrangement for optical scanning of a recording media in which fixed lamps are used to illuminate the point of reading. The lamps are arranged about the axis of rotation of the optical wheel, and the light transducer is outside the axis of rotation at a distance further away from the medium than the axis of rotation.

PATENTED DEC 22 1970

INVENTOR

CHRISTIAN ORTMANN

BY

ATTORNEY

INVENTOR
CHRISTIAN ORTMANN

BY

ATTORNEY

3,549,894

ARRANGEMENT FOR OPTICALLY SCANNING A RECORDING MEDIUM USING FIXED LAMPS FOR ILLUMINATION

BACKGROUND OF THE INVENTION

The present invention relates to an arrangement for the scanning of recording media of strip-or tape-shaped design. The characters to be scanned are arranged in a line-wise fashion, with the direction of movement thereof extending vertically in relation to the line direction.

Similar types of scanning arrangements as known are described, for example, in the German Auslegeschrift (DAS) 1,233,595. These arrangements consist of a guide for the recording medium and of a wheel whose axis is oriented approximately parallel in relation to the direction of feed of the recording medium. The wheel carries several optical scanning devices, each of which comprises a lens and an illuminating arrangement consisting of at least one lamp and one condenser lens, the optical axis of the lens is arranged radially on the wheel and stands vertically on the respective portion of the recording medium to be scanned which is bent about the axis of the wheel. Each lens of the wheel images a portion of the recording medium on a light transducer arrangement at the center of the wheel. The associated illuminating arrangement illuminates the respective imaged portion of the recording medium. When turning the wheel a strip or tape, which is transversely oriented in relation to the direction of feed of the recording medium, is projected successively on to the light transducer arrangement. If, during the turning of the wheel, one scanning device has exceeded the edge of the recording medium the next one will seize a new strip or tape. By simultaneous feeding of the recording medium in the direction of the wheel axis, there is accomplished the scanning of the recording medium.

In this type of arrangement, it is necessary to supply the current to the lamps on the wheel by sliding contacts. Since all of the lamps are switched on, because of the rapid scanning of the recording medium, it is impossible to switch on the lamps only in the moment in which they are used. These multiple arrangements, due to the heat dissipation thereof, require additional cooling.

In addition the light, in the course of the wheel rotation, falls upon the light transducer at a continuously changing angle, with the maximum value $\alpha_{max}$ being determined by:

$$\alpha_{max} = \frac{360°}{2n} \quad (1)$$

in which n indicates the number of the scanning devices arranged on the wheel. This angle should be kept as small as possible because the many light transducers, for the purpose of the character recognition, are sensitive to these angles.

This property requires a reduction of $\alpha_{max}$, and to increase the number of scanning arrangements on the wheel causes a considerable heatdevelopment. If a small number of scanning arrangements are used, the maximum angle of incidence upon the light transducer becomes large and there will be large dead zones.

The present invention overcomes the aforementioned problems and reduces them to a reasonable extent.

SUMMARY OF THE INVENTION

It is an object of the invention to provide an arrangement for the optical scanning of recording media on which the characters are arranged in a line-wise fashion, with the direction of movement thereof being approximately vertically in relation to the line-of-print direction, and wherein a wheel is pivoted on a shaft approximately parallel in relation to the direction of movement of the recording medium, with this wheel carrying several scanning devices consisting of a lens and of at least one condenser lens.

According to the invention, the lamp or lamps which illuminate the point of reading on the recording medium are arranged in about the extension of the axis of rotation of the wheel, and the light receivers are arranged outside the axis of rotation of the wheel, preferably at a further distance away from the recording medium than the axis.

The invention has two substantial advantages, one is that the power supply, due to the stationary lamps, does not need to be coupled by sliding contacts and, on the other is that each scanning station does not require a lamp of its own. Though one lamp is sufficient, it is still more appropriate to provide two lamps, so as to avoid shadow effects.

This scanning arrangement also permits the angle under which the light from the imaging lenses impinges upon the light transducer arrangement to be reduced without increasing the number of scanning devices on the wheel. The reduction of this angle can be achieved in that the distance of the light-receiving arrangement from the axis of rotation of the wheel is made greater than the distance of the lenses from the axis. The light transducer arrangement is arranged in the plane of the lens path, and the spaced relation of the lenses on the wheel is chosen so that the lenses not scanning will not effect the path of rays from the lens which are scanning.

The light transducer arrangement may also be arranged outside the plane of the path of the lens mounted to the wheel, in order to obtain a better geometry for imaging.

BRIEF DESCRIPTION OF THE DRAWINGS

The invention will now be explained in detail and by way of example with reference to FIGS. 1 to 4 of the accompanying drawings, in which.

DESCRIPTION OF THE PREFERRED EMBODIMENTS

Figure 1:
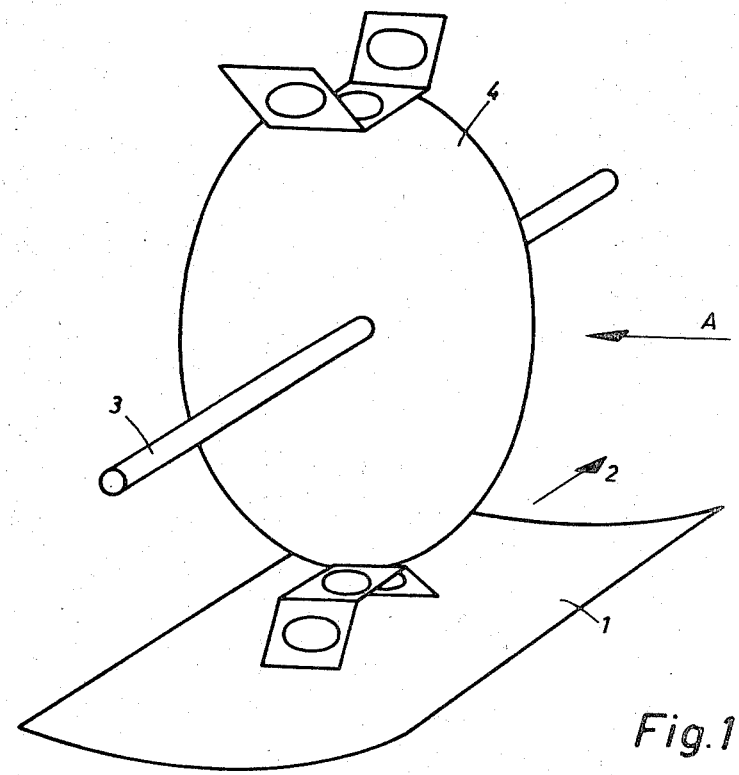
FIG. 1 shows in perspective the scanning arrangement according to the invention.

Referring to FIG. 1, the voucher 1 is moved on a suitable table through the scanning station in the direction indicated by the arrow 2. The voucher 1 is bent so that its center of curvature is lying in the axis of rotation 3 of the wheel 4. The bend of the voucher is concentrical in relation to the wheel circumference. Several optical scanning devices are arranged at an equal spaced relation along the wheel circumference. Only two of these optical scanning devices are shown in the drawing for the sake of simplicity and clarity.

Figure 2:
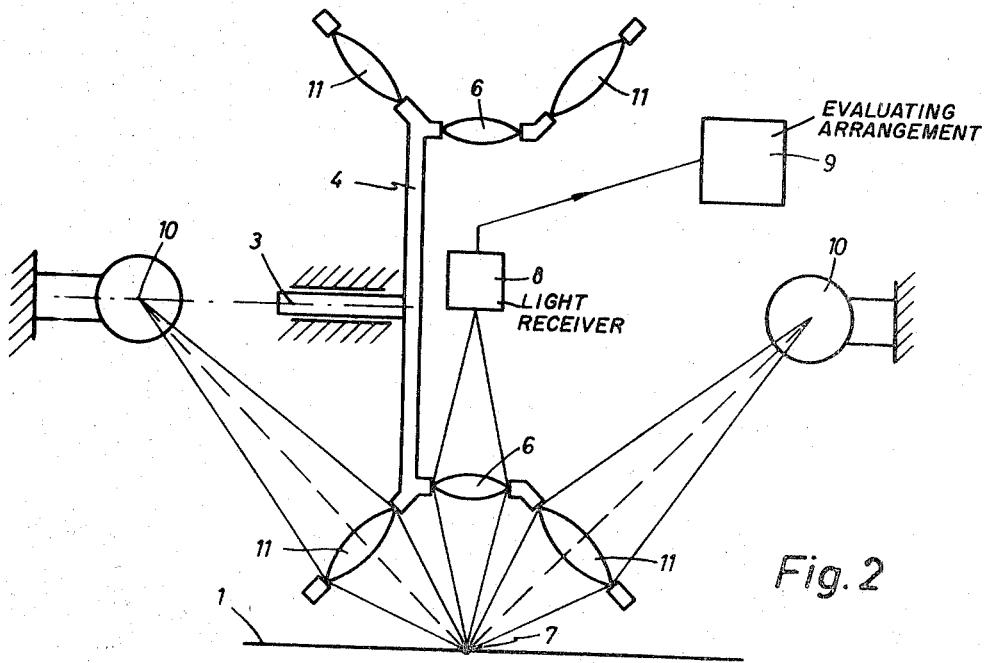
FIG. 2 shows the scanning arrangement of FIG. 1 in the direction of arrow A, and includes further details of the optical parts; and 3 and 4 show examples for reducing the angle $\alpha_{max}$.

FIG. 2 shows details of the optical scanning devices, consisting of the lens 6, mounted to the circumference of the wheel 4, for projecting the scanned character from the scanning point 7 onto the stationary light transducer arrangement 8 arranged in the axis 3 of the wheel 4. The optical signal is converted into an electrical signal which is then applied to the evaluating or utilizing arrangement 9.

The illumination of the scanning point 7 is effected by two illuminating devices 10 via condenser lens 11 reducing shadow effects. The lamps 10 are not connected to the wheel 4, but are stationary and so designed that their light radiation is symmetrical in relation to the axis of rotation 3. This avoids fluctuations during the rotation of the wheel 4. Halogen lamps of high candle power employing helical filaments (burners) are suitable, so that the number of lamps required for illuminating the reading point 7 can be kept minimum. Due to the stationary arrangement of the lamps 10, there is avoided a power supply using sliding contacts. The angular range which is assumed by a scanning device on the wheel, is dependent upon the number of scanning devices employed. However, the angle under which the light from the imaging lenses impinges upon the light transducer arrangement should be as small as possible because the light transducers, as a rule, are sensitive to angle errors, and in the case of light transducer matrices, disturbing cantings of the image are caused by too large an angle of incidence. For this reason, larger dead zones must be taken into consideration if there is not to be an increase in the number of scanning devices.

Figure 3:
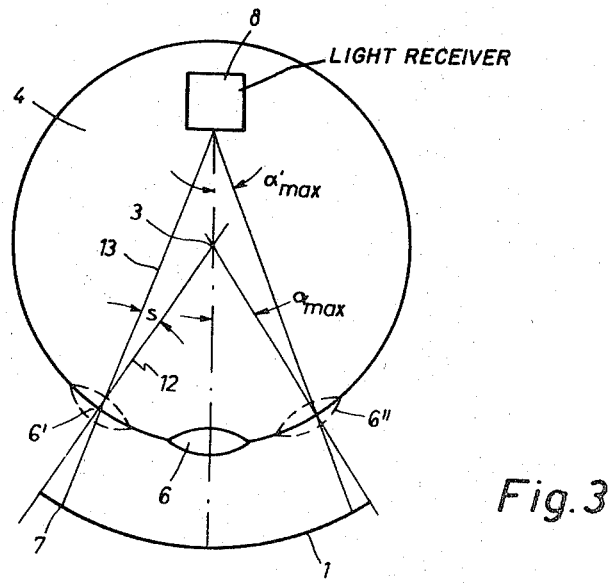
Figure 4:
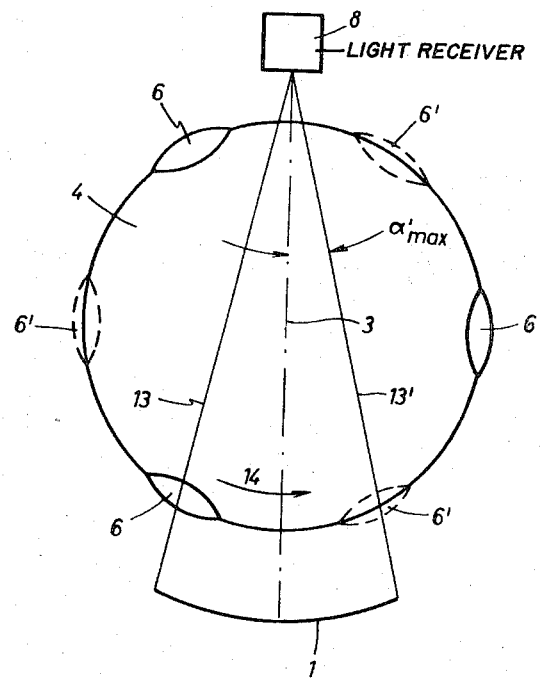

FIGS. 3 and 4 show two examples how to obtain a smaller angle $\alpha_{max}$ without enlarging the number of scanning devices, and without enlarging the dead zones.

In FIG. 3, the light transducer arrangement 8 is not arranged in the axis of rotation 3, but further away from the record medium than the axis 3.

For reasons of clarity only the lens 6 of one scanning arrangement is shown. In so doing, it is assumed that the lens 6 is effective from the point 6' via 6 to 6''. As $\alpha_{max}$ there is assumed half the angular range. The optical axis 12 of the lens 6 is pointed in all positions towards the axis of rotation 3, whereas the center line 13 of imaging the point 7 on to the light transducer matrix 8 deviates therefrom. The angle 2 between the lines 12 and 13 does not cause an error, because the lenses have a sufficiently large image field. By this arrangement, the angle $\alpha_{max}$ is substantially reduced to $\alpha'_{max}$, and is thus prevented from disturbing the angle-dependent sensitivity of the light receivers.

Further, it is possible to arrange the light transducer arrangement 8 according to FIG. 4 far away from the axis 3, in order to further reduce the angle $\alpha'_{max}$. In this case the number of lenses 6 on the wheel 4 may be chosen so that a sufficient spacing will remain between each two lenses, in order to let the light fall freely upon the light transducer matrix 8. On the wheel 4, there are arranged three lenses shown in the positions 6 and 6' in which one starts at 6 and finishing at 6' to scan the recording medium. During the movement of a lens 6 over the recording medium in the direction as indicated by the arrow 14, the other two lens do not disturb the path of rays towards the light transducer matrix which is shown to be restricted by the lines 13 and 13'.

In the arrangement according to FIG. 4, the light transducer arrangement or matrix 8 is positioned near the plane of the wheel 4. It may also be arranged outside this plane, so that the light, in the case of a closer arrangement of the lenses 6, is not being disturbed by those lens passing through the cone 13-—13'.

In the arrangements according to FIG. 3 and 4 it is possible to use a source of illumination according to FIG. 2, which for the sake of clarity has been omitted in the drawing. For the purpose of adapting to the geometry of the image according to FIGS. 3 and 4, the lamps may appropriately be arranged somewhat outside the axis 3.

I claim: 1. An 127 for the optical 117 of recording media on which characters are arranged in a line-wise fashion and whose direction of movement is approximately vertical in relation to the line-of-print direction, comprising a rotatable wheel 4 pivotally mounted on a shaft 3 whose axis is parallel in relation to the direction of movement of the recording medium, the wheel carrying several scanning devices including a lens 6 and at least one condenser lens 11, a lamp 10 illuminates the reading point on the recording medium 1 and is arranged in the extension of the axis of rotation of the wheel 4 and a light receiver 8 is arranged outside the axis of rotation of said wheel 4 at a distance further away from the recording medium 1 than the axis.

2. An arrangement for the optical scanning of recording media according to claim 1, wherein the distance of the light receiver arrangement 8 from the axis of rotation of said wheel 4 is greater than the distance of the lenses 6 from the axis, and is lying within the plane of the path of said lenses 6, and the spaced relation of said lenses 6 is chosen so that any lenses 6 which are not scanning, does not effect the path of rays of the lens 6 which is scanning.

3. An arrangement for the optical scanning of recording media according to claim 2, wherein said light transducer arrangement 8 is arranged outside the plane of the path of said lenses (6) on said wheel 4.

UNITED STATES PATENT OFFICE
CERTIFICATE OF CORRECTION

Patent No. 3,549,894          Dated December 22, 1970

Inventor(s) Christian Ortmann

It is certified that error appears in the above-identified patent and that said Letters Patent are hereby corrected as shown below:

In Column 4, line 9, delete "127" and substitute therefore --arrangement--;

In Column 4, line 9, delete "117" and substitute therefore --scanning--.

Signed and sealed this 29th day of June 1971.

(SEAL)
Attest:

EDWARD M. FLETCHER, JR.          WILLIAM E. SCHUYLER,
Attesting Officer                Commissioner of Pate